(12) United States Patent
Katoh et al.

(10) Patent No.: US 7,181,634 B2
(45) Date of Patent: Feb. 20, 2007

(54) APPARATUS FOR SWITCHING BETWEEN A COMBINATION OF OPERATING MODES SUCH THAT THE POWER CONSUMED IS REDUCED RELATIVE TO THE TIME OF SWITCHING

(75) Inventors: Takayuki Katoh, Yokohama (JP); Seiichi Kawano, Kanagawa-ken (JP); Kenji Oka, Kanagawa-ken (JP); Noritishi Yoshiyama, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 349 days.

(21) Appl. No.: 10/739,512

(22) Filed: Dec. 18, 2003

(65) Prior Publication Data

US 2004/0181700 A1    Sep. 16, 2004

(30) Foreign Application Priority Data

Feb. 26, 2003    (JP) .............................. 2003-048764

(51) Int. Cl.
*G06F 1/28* (2006.01)
(52) U.S. Cl. ...................... 713/320; 713/300; 713/330; 710/15
(58) Field of Classification Search ................ 713/300, 713/320, 330; 716/1; 363/65; 327/351, 327/513; 710/15
See application file for complete search history.

(56) References Cited

U.S. PATENT DOCUMENTS

| 4,779,184 | A | * | 10/1988 | White .......................... 363/65 |
| 5,760,636 | A | * | 6/1998 | Noble et al. ................. 327/513 |
| 5,926,394 | A | * | 7/1999 | Nguyen et al. ................. 716/1 |
| 6,664,775 | B1 | * | 12/2003 | Clark et al. .................. 323/351 |
| 2003/0126478 | A1 | * | 7/2003 | Burns et al. ................. 713/300 |

* cited by examiner

*Primary Examiner*—Thomas Lee
*Assistant Examiner*—Sean Weinman
(74) *Attorney, Agent, or Firm*—Anthony M. Del Zoppo, III; Driggs, Hogg & Fry Co., LPA (57) ABSTRACT

An information processor having a plurality of operating modes differing in power consumption and capable of changing the operating mode according to the amount of processing has periodic switching detection means of performing detection as to whether the information processor is periodically switching from a low-power-consumption operating mode in which the power consumption is lower to a high-power-consumption operating mode in which the power consumption is higher in the plurality of operating modes, and operating mode changing means of changing the operating modes between which the information processor switches to a combination of the operating modes such that the difference between the power consumptions is reduced relative to that at the time of switching between the low-power-consumption operating mode and the high-power-consumption operating mode if the switching cycle detected by the periodic switching detection means is shorter than a set cycle determined in advance.

9 Claims, 10 Drawing Sheets

| OPERATING MODE | OUTLINE |
|---|---|
| C0 | OPERATING MODE IN WHICH INSTRUCTIONS ARE EXECUTED |
| C1 | OPERATING MODE IN WHICH NO INSTRUCTIONS ARE EXECUTED BUT CACHE MEMORY COHERENCY CONTROL IS PERFORMED |
| C2 | OPERATING MODE IN WHICH INTERNAL CLOCK OF PROCESSOR IS STOPPED WHILE SUPPLY OF CLOCK TO PROCESSOR IS CONTINUED |
| C3 | OPERATING MODE IN WHICH CLOCK TO PROCESSOR IS STOPPED |
| C4 | OPERATING MODE IN WHICH VOLTAGE OF POWER SUPPLY TO THE PROCESSOR IS FURTHER REDUCED WHILE SUPPLY OF CLOCK TO PROCESSOR IS STOPPED |

FIG. 5

| EFFECTIVE OPERATING MODES | TYPE-1 OS | TYPE-2 OS |
|---|---|---|
| C0, C1, AND C2 | PSEUDO-SETTING OF BM_STS IS MADE | NOTIFYING BIOS |
| C0, C1, C2, AND C3 | SWITCHING FROM C4 TO C3 IS MADE INEFFECTIVE | NOTIFYING BIOS |
| C0, C1, C2, C3, AND C4 | SWITCHING FROM C4 TO C3 BY HARDWARE IS MADE EFFECTIVE | NOTIFYING BIOS |

FIG. 12

APPARATUS FOR SWITCHING BETWEEN A COMBINATION OF OPERATING MODES SUCH THAT THE POWER CONSUMED IS REDUCED RELATIVE TO THE TIME OF SWITCHING

BACKGROUND OF THE INVENTION

The present invention relates to an information processor, a control method, a program and a recording medium. More particularly, the present invention relates to an information processor in which an energy saving function is controlled, and a control method, a program and a recording medium for this control.

In recent years, an energy saving technique for extending the battery drive time of portable information terminals or the like has attracted attention. For example, a technique for changing power consumption according to the amount of computation processing has been used. An example of this is a paper written by Compact Computer Corporation and other four companies entitled, "Advanced Configuration and Power Interface Specification Revision 2.0a", Mar. 31, 2002.

In portable information terminals using the above-described technique, there is a possibility of occurrence of noise (acoustic noise) due to periodic change in power consumption of a processor. For example, a capacitor used for stabilizing power supplied to a processor repeats charge and discharge each time power consumption is periodically changed. By this charge and discharge, the capacitor expands and contracts to cause a mount board to warp periodically and to vibrate by warping. If the number of contraction and extraction cycles is in an audible frequency band, the portable information terminal generates noise harsh to the user's ear.

Therefore, an object of the present invention is to provide an information processor, a control method, a program and a recording medium capable of solving the above-described problem. This object can be attained by a combination of features described in the independent claims in the appended claims. In the dependent claims, further advantageous examples of the present invention are specified.

SUMMARY OF THE INVENTION

According to a first mode of the present invention, provided is an information processor having a plurality of operating modes differing in power consumption and capable of changing the operating mode according to the amount of processing, the information processor having periodic switching detection means of performing detection as to whether the information processor is periodically switching from a low-power operating mode in which the power consumption is lower to a high-power operating mode in which the power consumption is higher in the plurality of operating modes, and operating mode changing means of changing the operating modes between which the information processor switches to a combination of the operating modes such that the difference between the power consumptions is reduced relative to that at the time of switching between the low-power operating mode and the high-power operating mode if the switching cycle detected by the periodic switching detection means is shorter than a set cycle determined in advance, a control method of controlling the information processor, a program, and a recording medium on which the program is recorded.

In the summary of the present invention, not all the necessary features of the invention are listed. Subcombinations of the features can constitute the present invention.

DETAILED DESCRIPTION OF A PREFERRED EMBODIMENT

The present invention will be described with respect to an embodiment thereof. The embodiment described below, however, is not limiting of the invention set forth in the appended claims, and all combinations of features described in the description of the embodiment are not necessarily indispensable to the solution according to the present invention.

Figure 1:
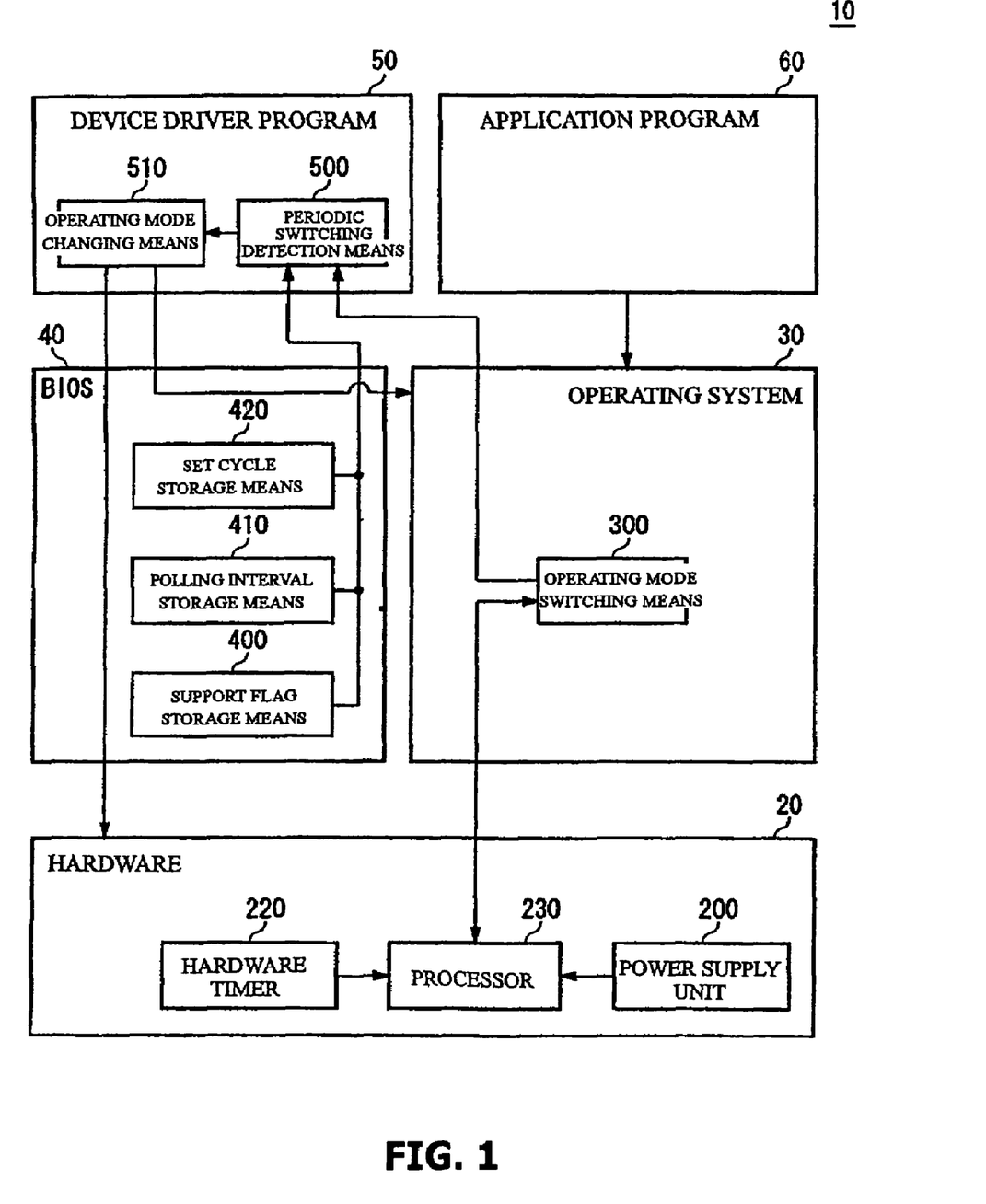
FIG. 1 is a block diagram of an information processor 10.

FIG. 1 is a block diagram of an information processor 10. The information processor 10 is provided with hardware 20 having a plurality of operating modes differing in power consumption, an operating system 30, a BIOS 40 which conforms to the ACPI (Advanced Configuration and Power Interface) standard for control of power consumption, a device driver program 50, and an application program 60. The information processor 10 is arranged with the aim of preventing noise (acoustic noise) caused by periodically switching the operating mode of a processor or the like.

The hardware 20 has a processor 230, a power supply unit 200 which supplies power to the processor 230, and a hardware timer 220 which effects a timer interrupt to the processor 230. The processor 230 changes the operating mode according to the amount of processing of information. For example, when the processor 230 receives an instruction from an operating mode switching means 300 detecting a state of the processor 230 not being used, it switches to a low-power operating mode in which the power consumption is lower. Each time the processor 230 receives a timer interrupt from the hardware timer 220, it switches to a high-power operating mode in which the power consumption is higher, and makes the operating mode switching means 300 again detect whether the processor 230 is being used.

The operating system 30 has the operating mode switching means 300 for instructing the processor 230 to change the operating mode. When the processor 230 is not being used, the operating mode switching means 300 instructs the processor 230 to perform switching from the high-power operating mode to the low-power operating mode. When the processor 230 receives a timer interrupt from the hardware timer 220, the operating mode switching means 300 changes the operating mode from the low-power operating mode to the high-power operating mode. The operating mode switching means 300 may change the cycle of switching of the operating mode according to an instruction from an application program such as an application program 60.

A case where the processor 230 is not being used is defined, for example, as a case where no instruction from an application program is executed in a predetermined period. Alternatively, the operating mode switching means 300 may determine that the processor 230 is not being used when the proportion of the actual amount of processing with respect to the limit of processing ability of the processor 230, i.e., the CPU occupancy rate, is lower than a predetermined value.

The BIOS 40 has a support flag storage section 400 in which a support flag for indication as to whether or not noise will be caused by switching of the operating mode is stored, a polling interval storage section 410 in which information on a polling interval for determination as to whether the information processor is in such a state as to generate noise is stored, and a set cycle storage section 420 in which information on a set cycle used for comparison with a switching cycle is stored. For example, a designer of the information processor 10, when he designs hardware 20, examines in advance whether noise can be generated, and sets the above-described parameters in the BIOS 40 according to the results of examination. Thus, the designer of the information processor 10 enables prevention of noise in various models of the information processor 10 by adjusting the parameters without changing any of the pieces of hardware and software.

The device driver program 50 has a periodic switching detection means 500 for detecting whether the information processor 10 is periodically switching from the low-power mode to the high-power mode, and an operating mode changing means 510 for changing the operating mode between which the information processor 10 performs switching. Each time the support flag obtained from the support flag storage section 400 indicates that noise is caused if the operating mode is changed, the periodic switching detection means 500 obtains a switching cycle from the operating mode switching means 300 at the polling intervals obtained from the polling interval storage means 410.

The periodic switching detection means 500 obtains as a switching cycle the cycle in which a timer interrupt to the processor 230 is effected by the hardware timer 220. Alternatively, the periodic switching detection means 500 may obtain as a switching cycle the cycle of time slicing in which the operating system 30 assigns the processor 230 to the application program 60. For example, a method for obtaining a switching cycle is used in which a timer resolution used in Windows° is obtained as a switching cycle by calling an API predetermined in the operating system 30, for example, ExSetTimerResolution in Windows°. The periodic switching detection means 500 compares the obtained switching cycle with the set cycle obtained from the set cycle storage means 420, and notifies the operating mode changing means 510 of the result of comparison.

If the comparison result from the periodic switching detection means 500 shows that the switching cycle is shorter than the predetermined set cycle, the operating mode changing means 510 changes the operating modes between which the information processor 10 performs switching.

As described above, the information processor 10 changes the operating modes between which the information processor 10 performs switching, thereby preventing noise generated by periodic switching between the operating modes. Also, the designer or the like of the information processor 10 can perform noise control suitable for various models of the information processor 10 by changing the support flag 400 and the value stored in the set cycle storage means 420 without changing the hardware 20 or the device driver program 50.

Figure 2:
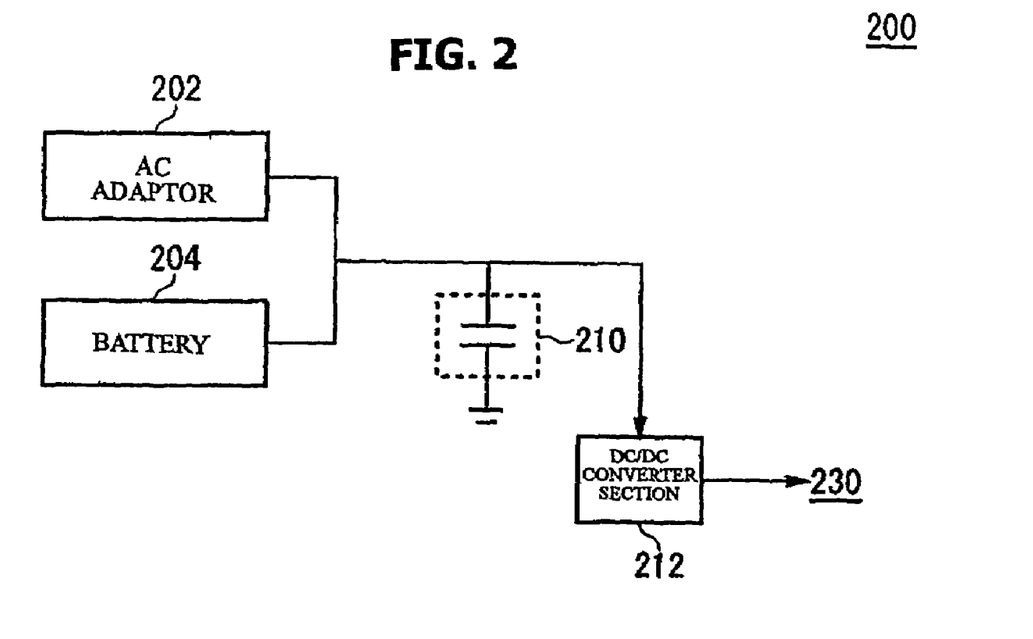
FIG. 2 is a block diagram of a power supply unit 200.

FIG. 2 is a block diagram of the power supply unit 200. The power supply unit 200 has an AC adaptor 202 which converts AC power supplied from an external power supply or the like into DC power, a battery 204 which supplies power to the information processor 10 when the information processor 10 is not supplied with power from the outside, a capacitor mount 210 on which capacitor for stabilizing power received from the AC adaptor 202 or the battery 204 is mounted, a DC/DC converter section 212 which changes the voltage of power received from the AC adaptor 202 or the battery 204 and supplies the power to the processor 230.

When the processor changes the operating mode, the DC/DC converter section 212 changes power supplied to the processor 230. Correspondingly, the amount of consumption of power from the AC adaptor 202 or the battery 204 is changed. However, the AC adaptor 202 or the battery 204 cannot change the amount of power immediately after the processor 230 has changed the operating mode. That is, a delay occurs in changing the amount of power from the time when the operating mode is changed. The capacitor is provided on the capacitor mount 210 for the purpose of limiting a change in voltage due to this delay. That is, when the power supplied from the AC adaptor 202 or the battery 204 to the DC/DC converter section 212 is in excess, the capacitor is charged with the excess amount of power. At the time of deficiency of the power supplied from the AC adaptor 202 or the battery 204 to the DC/DC converter section 212, the power charged in the capacitor is discharged to compensate for the deficiency of power.

Figure 3:
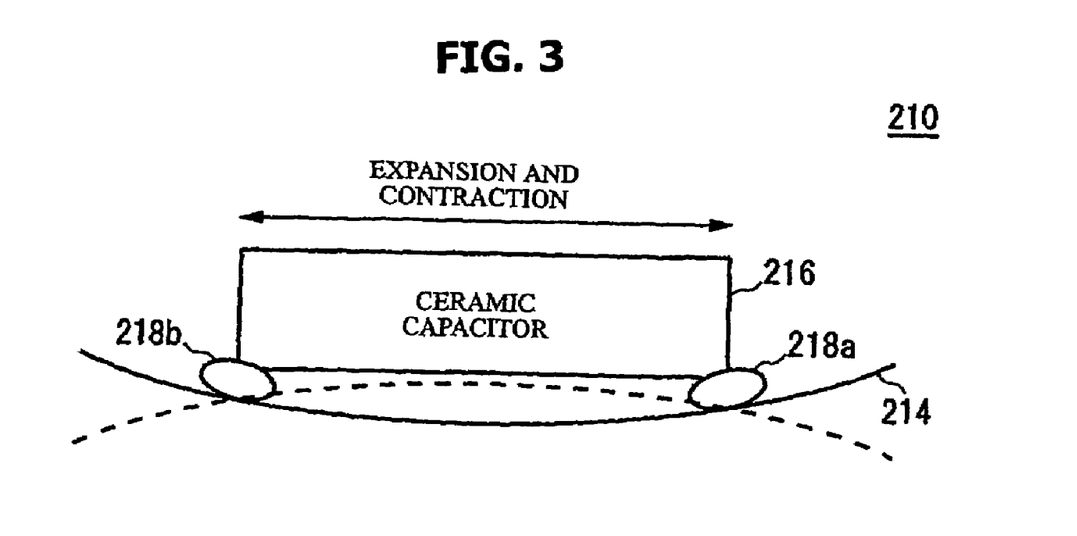
FIG. 3 is a schematic diagram of a capacitor mount 210.

FIG. 3 schematically shows the capacitor mount 210. The capacitor mount 210 has a capacitor mount base plate 214, a ceramic capacitor 216, and soldering mount portions 218a and 218b at which the ceramic capacitor 216 is soldered the capacitor mount base plate 214. The ceramic capacitor 216 expands and contracts according to charge and discharge of power. In this event, the capacitor mount base plate 214 is warped. For example, warping of the capacitor mount base plate 214 is repeated in the cycle in which the ceramic capacitor 216 expands and contracts, i.e., switching cycle in which switching between the operating modes is performed. The information processor 10 thereby generates noise if the number of switching cycles is in an audible range. Since the capacitor mount base plate 214 is provided in a case constituting the hardware 20, noise is increased by resonance with the case.

A method is conceivable in which aluminum electrolytic capacitor is used in place of the ceramic capacitor 216 to prevent expansion and contraction of the capacitor. However, an aluminum electrolytic capacitor is larger in size and inferior in characteristics than the ceramic capacitor 216. Therefore it is difficult to mount an aluminum electrolytic capacitor in the small lightweight information processor 10.

Figure 4:
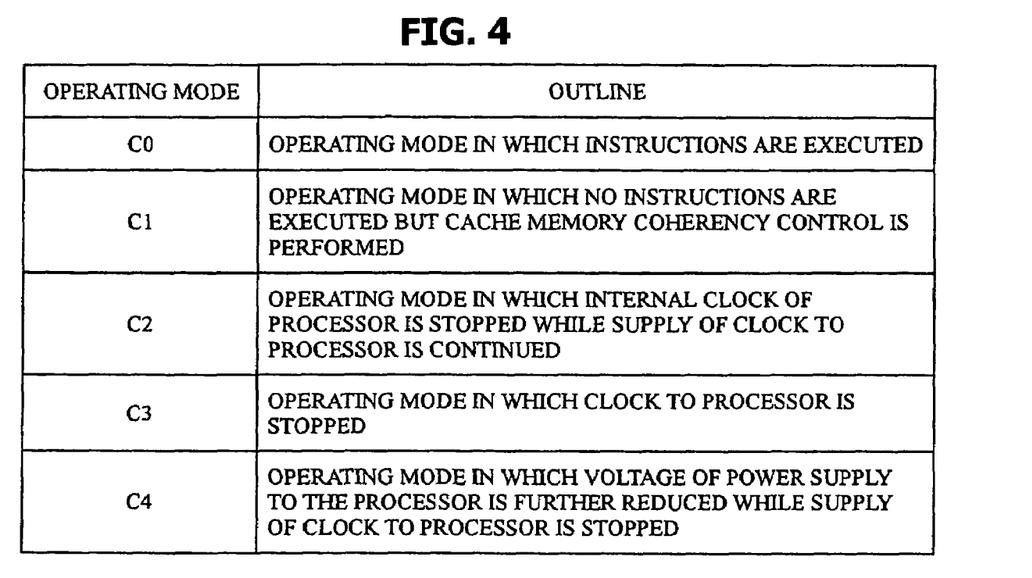
FIG. 4 is a diagram showing the outline of operating modes.

FIG. 4 shows the outline of the operating modes. For example, the information processor 10 conforms to the ACPI standard, and has an operating mode C0, which is an example of the high-power operating mode, an operating mode C1, and operating mode C2, an operating mode C3 in which the clock to the processor is stopped, and an operating mode C4 in which the voltage of power supply to the processor is further reduced. In the operating mode C0, the processor 230 executes instructions. In the operating mode C1, the processor 230 stops executing instructions but performs cache memory coherency control. In the operating mode C2, the supply of the clock to the processor 230 is continued to perform substantially the same control as that in the mode C1, while the internal clock of the processor 230 is stopped. In the operating mode C3, the clock to the processor is stopped and the processor operates, for example, at 1.05 V. In the operating mode C4, the clock to the processor is stopped as in the operating mode C3, but the voltage of power supply to the processor is further reduced, for example, to 0.75 V.

The plurality of operating modes shown in this figure may differ in drive voltage and drive current from each other, and may also differ in external or internal clock frequency from each other. For example, with switching from the operating mode C0 to the operating mode C4, the power consumption is reduced step by step. Further, the operating modes C1, C2, C3, and C4 may differ in latency in return to the operating mode C0.

Thus, the information processor 10 has a plurality of operating modes differ from each other in terms of the amount of information processed in the processor 230 and details of processing. The operating mode switching means 300 periodically performs switching from the operating mode C0, which is a high-power operating mode, to the operating mode C4, which is a low-power operating mode.

Figure 5:
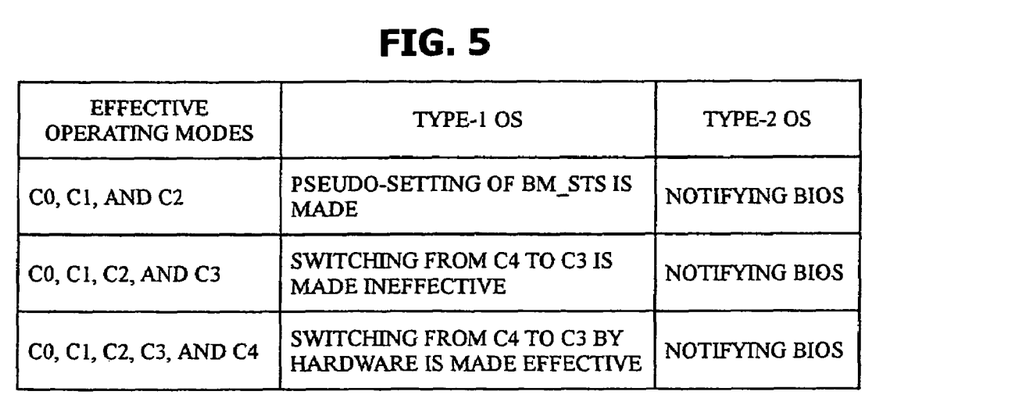
FIG. 5 is a diagram showing an example of a method of changing, by an operating mode changing means 510, operating modes between which switching is performed by an operating mode switching means 300.

FIG. 5 shows an example of a method of changing by the operating mode changing means 510 the modes between which switching is performed by the operating mode switching means 300. Description will first be made with respect to a case where the operating system 30 is a type-1 operating system, e.g., Windows° 2000. The operating mode changing means 510 changes the effective operating modes to the operating modes C0, C1, and C2 by making a pseudo-setting of BM_STS (bus master status). In this case, the operating mode switching means 300 uses the operating mode C2 as a low-power operating mode and the operating mode C0 as a high-power operating mode. That is, the operating mode switching means 300 periodically performs switching from the operating mode C2 to the operating mode C0. The type-1 operating system is capable of setting the operating modes C0, C1, C2, and C3. However, the type-1 operating system does not have the function of setting the operating mode C4. Then, the designer of the information processor 10 provides, in advance, in the hardware 20, a logic circuit or the like having the function of switching between the operating mode C3 and the operating mode C4. The operating mode changing means 510 makes ineffective the function of switching from the operating mode C4 to the operating mode C3 to change the effective operating modes to the operating modes C0, C1, C2, and C3. In this case, the operating mode switching means 300 periodically performs switching from the operating mode C3 to the operating mode C0.

Also, the operating mode changing means 510 makes effective the function of switching from the operating mode C4 to the operating mode C3 to change the effective operating modes to the operating modes C0, C1, C2, C3, and C4. In this case, the operating mode switching means 300 periodically performs switching from the operating mode C4 to the operating mode C0.

Description will next be made with respect to a case where the operating system 30 is a type-2 operating system, e.g., Windows° XP. In the type-2 operating system, the operating mode changing means 510 sets effective operating modes by notifying the BIOS 40 of them. For example, the operating mode changing means 510 makes a program described in ASL (ACPI Source Language) running on the BIOS 40 perform setting in a _CST object determined in the ACPI standard. The BIOS 40 changes the effective operating modes according to the notice thus given from the operating mode changing means 510.

Thus, the operating mode changing means 510 can replace a combination of high-power and low-power operating modes with another combination of operating modes by setting operating modes effective in the information processor 10.

Figure 6:
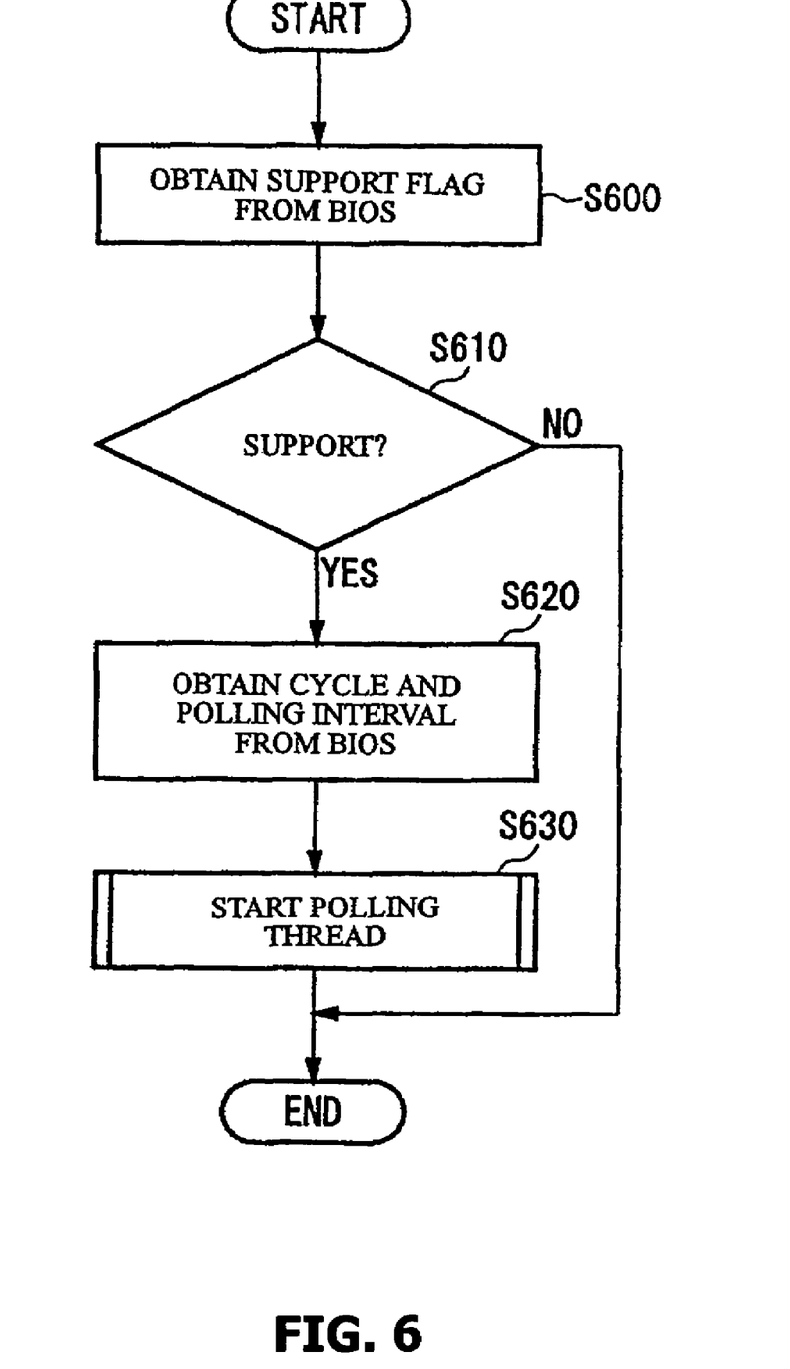
FIG. 6 is a diagram of the flow of operation of a device driver program 50.

FIG. 6 shows the flow of operation of the device driver program 50. The periodic switching detection means 500 obtains the support flag from the BIOS 40 (S600). In the case where the support flag indicates that noise is caused if the operating mode is changed (S610:YES), the periodic switching detection means 500 obtains a set cycle and a polling interval from the BIOS 40 (S620). The periodic switching detection means 500 also starts a polling thread (S630). In the case where the support flag indicates that the function of preventing noise is made ineffective (S610:NO), the periodic switching detection means 500 terminates the process.

Figure 7:
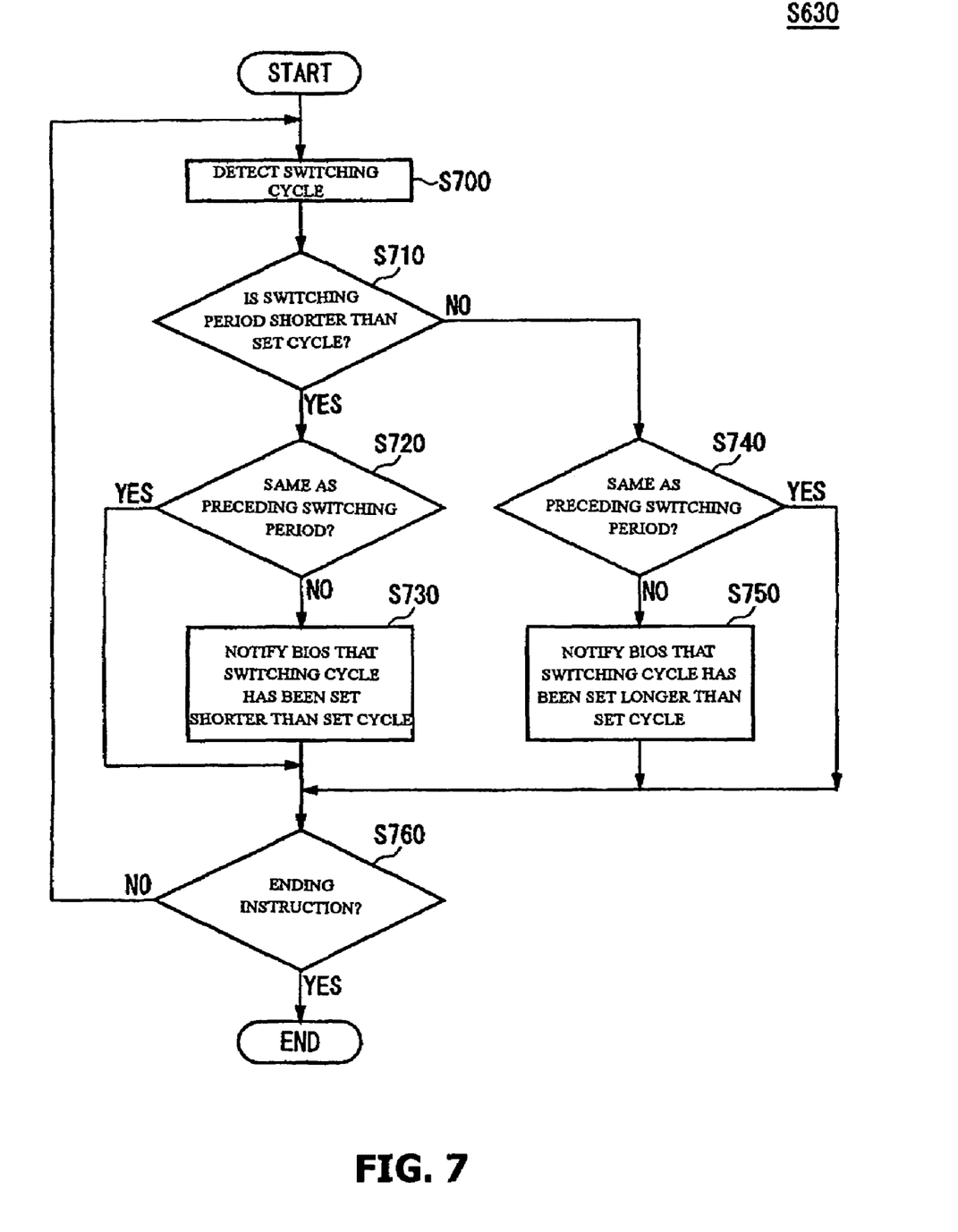
FIG. 7 is a diagram of the flow of operation in S630 shown in FIG. 6.

FIG. 7 shows the operation flow in S630 shown in FIG. 6. The periodic switching detection means 500 obtains a switching cycle from the operating mode switching means 300 (S700). If the switching cycle is shorter than the set cycle (S710:YES), the operating mode changing means 510 makes a determination as to whether or not the switching cycle obtained in S700 is equal to the switching cycle obtained in advance before S700 (S720). If they are equal to each other (S720:YES), the device driver program 50 moves the process to S760.

If the switching cycle obtained in S700 is different from the switching cycle obtained in advance before S700 (S720: NO), the operating mode changing means 510 notifies the BIOS 40 that the switching cycle has been changed so as to be shorter than the set cycle. Accordingly, the operating mode changing means 510 changes the operating modes between which switching is performed by the operating mode switching means 300 to a combination of the operating modes having a power consumption difference smaller than that between the low-power and high-power operating modes (S730). It is desirable that, in this step, the operating mode changing means 510 changes the low-power operating mode while maintaining the processing ability in the high-power operating mode. For example, in a case where the operating mode switching means 300 has performed periodic switching from the operating mode C4 to the operating mode C0, the operating mode changing means 510 changes the operating modes between which switching is performed by the operating mode switching means 300, for example, to the operating modes C3 and C0.

Also, the operating mode changing means 510 may change the combination of operating modes by setting a further condition requiring that the switching cycle is larger than a predetermined lower limit value. That is, if the switching cycle is within a predetermined range, e.g., in the range from about 0.2 ms to 1 ms, the operating mode changing means 510 changes the operating modes between which switching is performed by the operating mode switching means 300 to a combination of the operating modes having a power consumption difference smaller than that between the low-power and high-power operating modes, thus enabling effective avoidance of generation of noise which is in such a frequency range as to be harsh to the user's ear.

If the switching cycle is longer than the set cycle (S710: NO), the operating mode changing means 510 makes a determination as to whether or not the switching cycle obtained in S700 is equal to the switching cycle obtained in advance before S700 (S740). If they are equal to each other (S740:YES), the device driver program 50 moves the process to S760. If the switching cycle obtained in S700 is different from the switching cycle obtained in advance before S700 (S740:NO), the operating mode changing means 510 notifies the BIOS 40 that the switching cycle has been changed so as to be longer than the set cycle, thereby changing the operating modes between which switching is performed by the operating mode switching means 300 to a combination of the operating modes having a power consumption difference larger than that between the low-power and high-power operating modes (S750). It is desirable that, in this step, the operating mode changing means 510 changes the low-power operating mode while maintaining the processing ability in the high-power operating mode. For example, in a case where the operating mode switching means 300 has performed switching from the operating mode C3 to the operating mode C0, the operating mode changing means 510 changes the operating modes between which switching is performed by the operating mode switching means 300 to a combination of the operating modes having a power consumption difference larger than between the operating mode C3 and the operating mode C0, for example, to the operating modes C4 and C0.

If the device driver program 50 receives an ending instruction to end polling (S760:YES), it ends the process. If the device driver program 50 receives no ending instruction (S760:NO), it repeats processing from S700 by setting the obtained polling interval.

Figure 8:
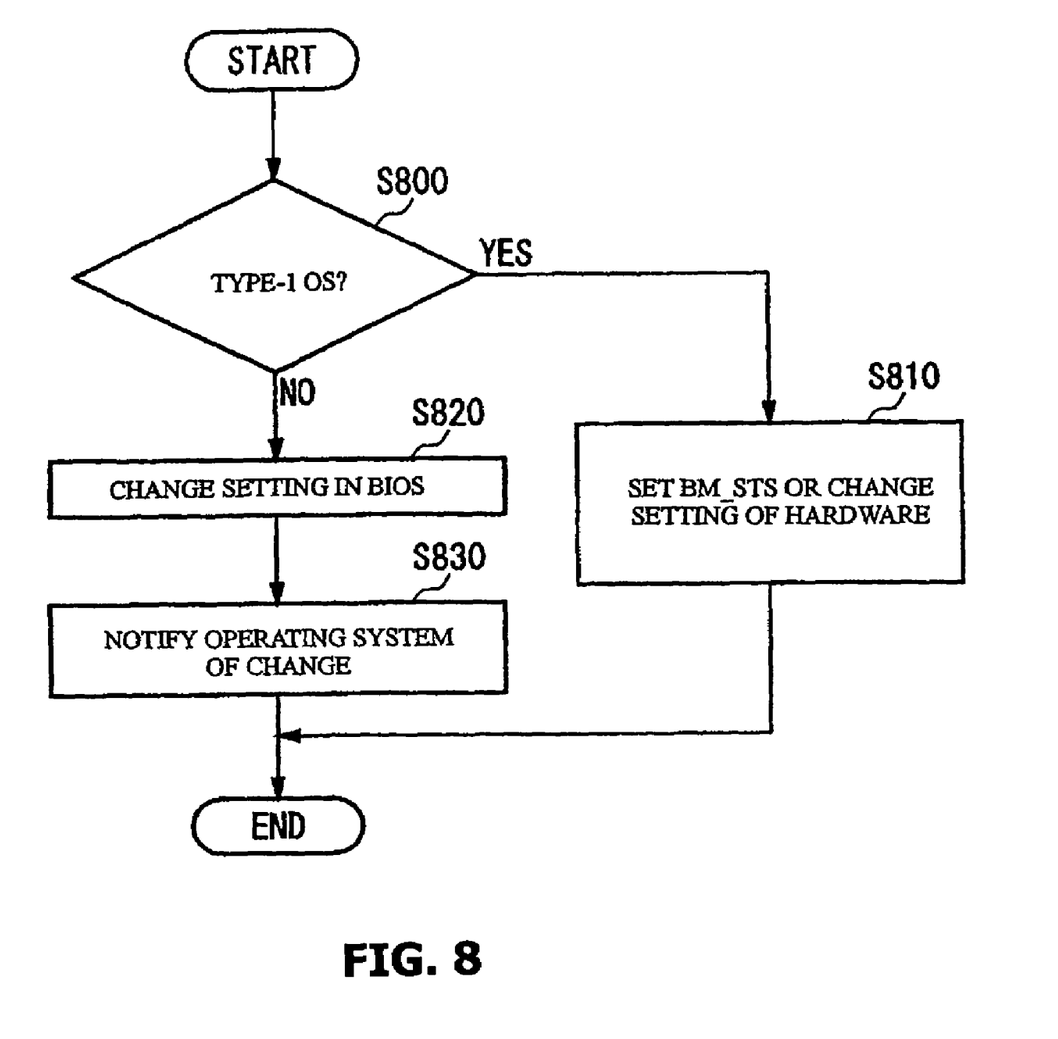
FIG. 8 shows the flow of operation of a BIOS 40.

FIG. 8 shows the flow of operation of the BIOS 40. Each time the BIOS 40 receives a notice from the operating system 30, it performs processing shown in this figure. If the operating system 30 is the type-1 operating system (S800: YES), the BIOS 40 changes the setting of BM_STS or the setting of the hardware (S810). If the operating system 30 is the type-2 operating system (S800:NO), the BIOS 40 changes information indicating the effective operating modes, e.g., information stored in the BIOS 40 in advance (S820) and notifies the operating system 30 that it has changed the information (S830).

Figure 9:
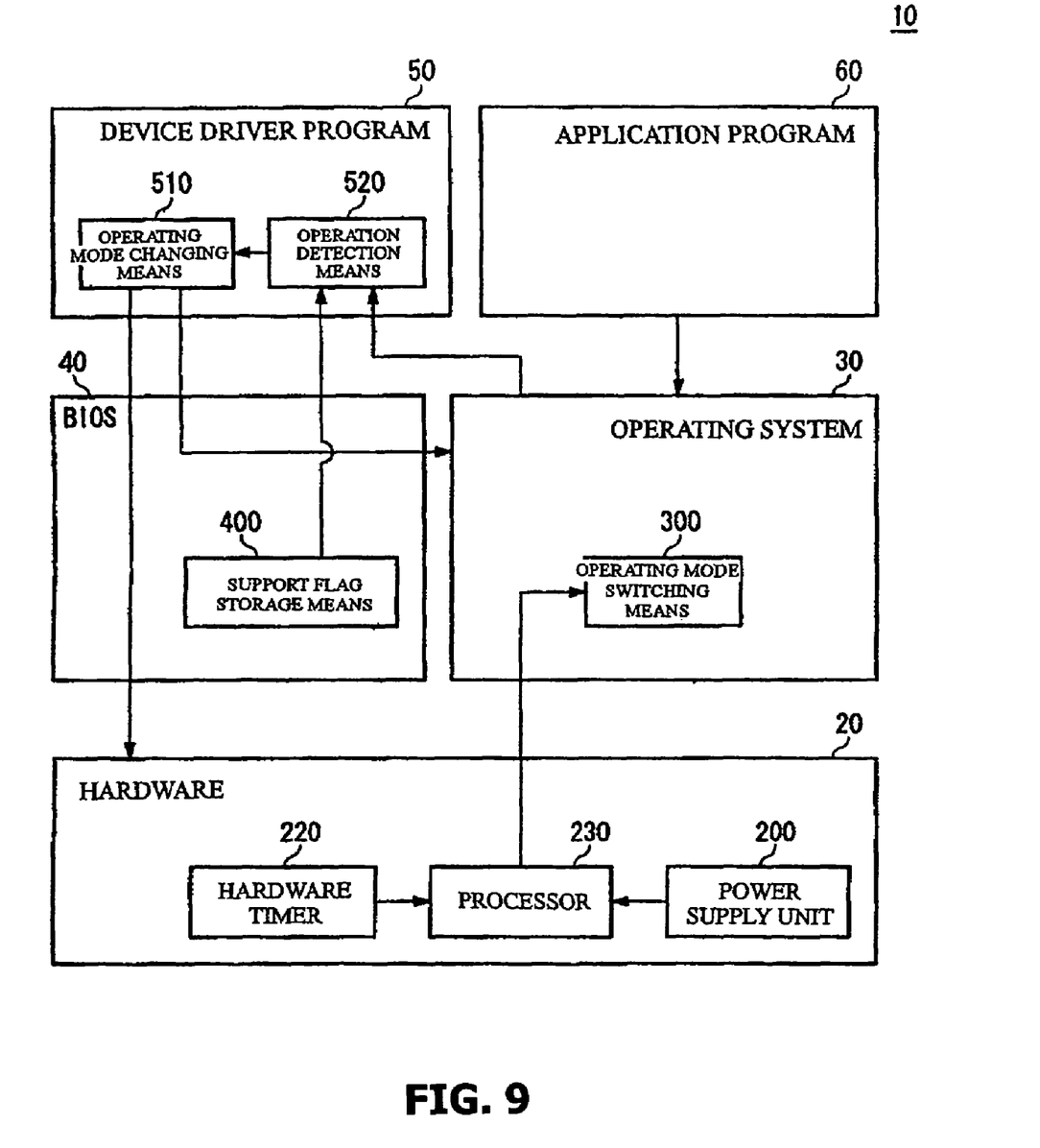
FIG. 9 is a block diagram of an information processor 10 in an example of modification.

FIG. 9 is a block diagram of an example of modification of the information processor 10. The information processor 10 has hardware 20, an operating system 30, a BIOS 40 and a device driver program 50. The device driver program 50 is configured so as to have an operation detection means 520 instead of the periodic switching detection means 500 in the device driver program 50 shown in FIG. 1. Also, the BIOS 40 may be formed so as not to have the polling interval detection section 410 and the set cycle storage section 420. In other respects, the configuration of the information processor 10 in this example is substantially the same as that of the information processor 10 shown in FIG. 1. Therefore, further description of the configuration will not be made.

The operation detection means 520 detects through the operating system 30 whether an application program 60 is operating, and sends the result of detection to the operating mode changing means 510. The application program 60 is an example of a cycle setting program, by which the switching cycle in which switching from a low-power operating mode to a high-power operating mode in a plurality of operating modes is performed is set shorter than a predetermined set cycle. Further, the application program 60 is an example of a reproduction application program, which is on standby until audio or image data is selected by a user, and which reproduces the audio or image data when the audio or image data is selected by the user. For example, the reproduction application program is Internet Explorer or Windows® Media Player using DirectX®.

Figure 10:
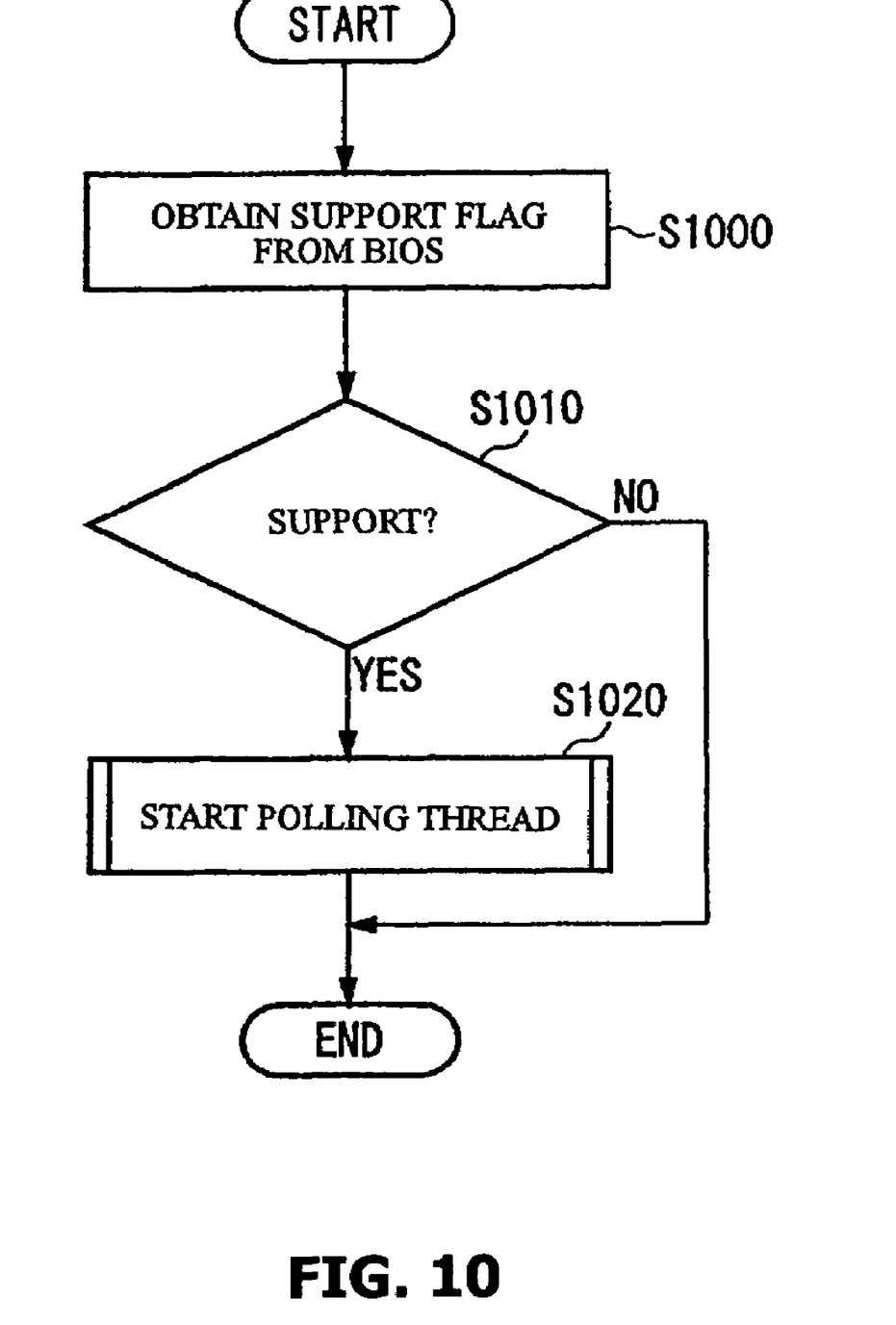
FIG. 10 is a diagram of the flow of operation of a device driver program 50 in the example of modification.

When the application program 60 is operating, the operating mode changing means 510 notifies the BIOS 40 that the switching cycle has been set shorter than the set cycle, thereby changing the operating modes between which switching is performed by the operating mode switching means 300 to a combination of the operating modes having a power consumption difference smaller than that between the low-power and high-power operating modes. FIG. 10 shows the flow of operation of the device driver program 50 in this example of modification. The periodic switching detection means 500 obtains the support flag from the BIOS 40 (S1000). In the case where the support flag indicates that noise is caused if the operating mode is changed (S1010: YES), the periodic switching detection means 500 starts a polling thread (S1020). In the case where the support flag indicates that noise is not caused even if the operating mode is changed (S1010:NO), the periodic switching detection means 500 terminates the process.

Figure 11:
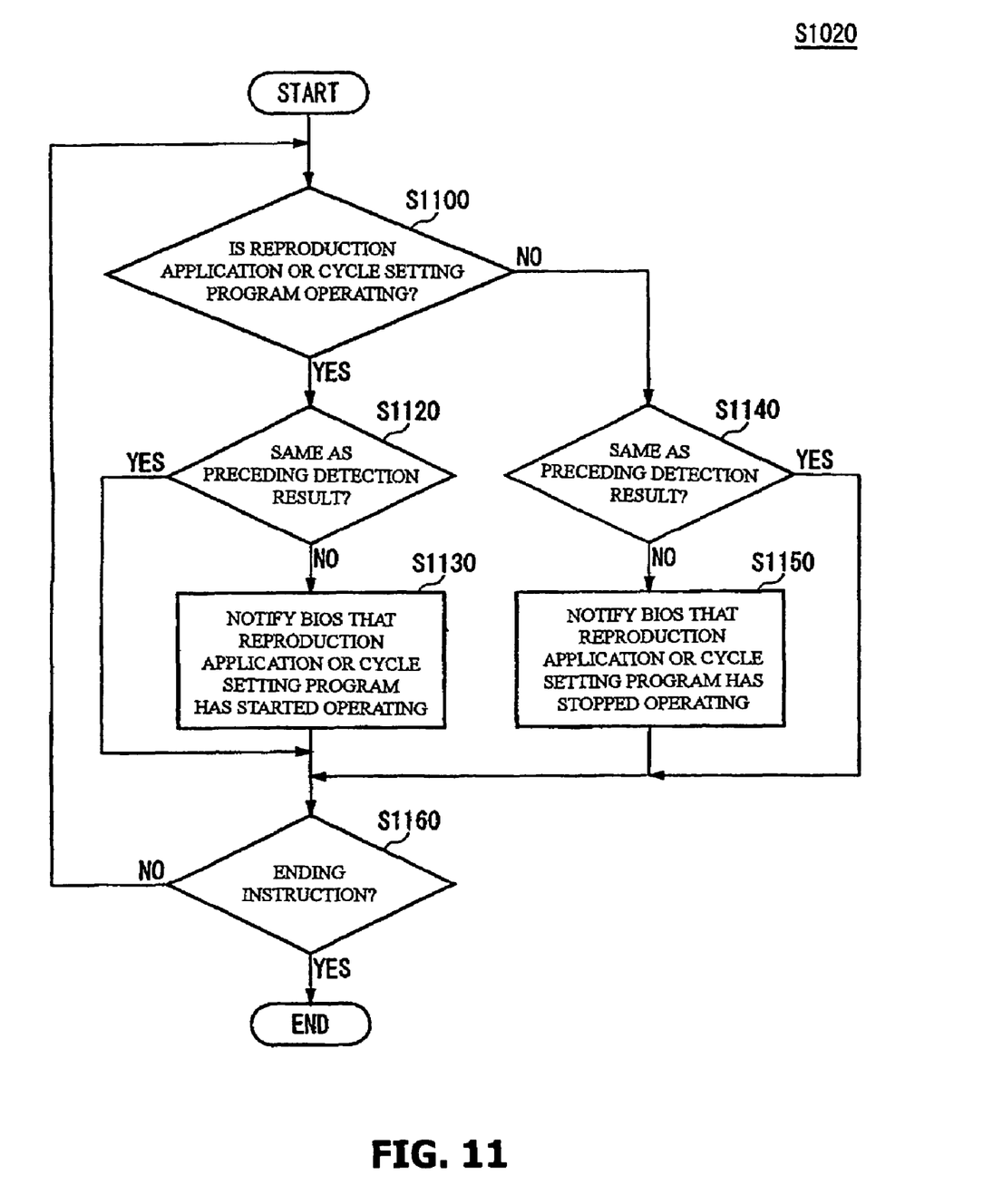
FIG. 11 is a diagram of the flow of operation of the device driver program 50 in step S1020 shown in FIG. 10.

FIG. 11 is the flow of operation of the device driver program 50 in S1020 shown in FIG. 10. If the reproduction application or the cycle setting program is operating (S1100: YES), the operating mode changing means 510 makes a determination as to whether or not the detection result is the same as the preceding one (S1120).

If the detection result is the same as the preceding one (S1120:YES), the device driver program 50 moves the process to S1160. If the detection result is different from the preceding one (S1120:NO), the operating mode changing means 510 notifies the BIOS 40 that the reproduction application or the cycle setting program has started operating, thereby changing the operating modes between which switching is performed by the operating mode switching means 300 to a combination of the operating modes having a power consumption difference smaller than that between the low-power and high-power operating modes (S1130).

If the reproduction application or the cycle setting program is not operating (S1100:NO), the operating mode changing means 510 makes a determination as to whether or not the detection result is the same as the preceding one (S1140). If the detection result is the same as the preceding one (S1140:YES), the device driver program 50 moves the process to S1160. If the detection result is different from the preceding one (S1140:NO), the operating mode changing means 510 notifies the BIOS 40 that the reproduction application or the cycle setting program has started operating, thereby changing the operating modes between which switching is performed by the operating mode switching means 300 to a combination of the operating modes having a power consumption difference larger than that between the low-power and high-power operating modes (S1150).

If the device driver program 50 receives an ending instruction to end polling (S1160:YES), it ends the process. If the device driver program 50 receives no ending instruction (S1160:NO), it repeats processing from S1100 by setting the obtained polling interval.

Figure 12:
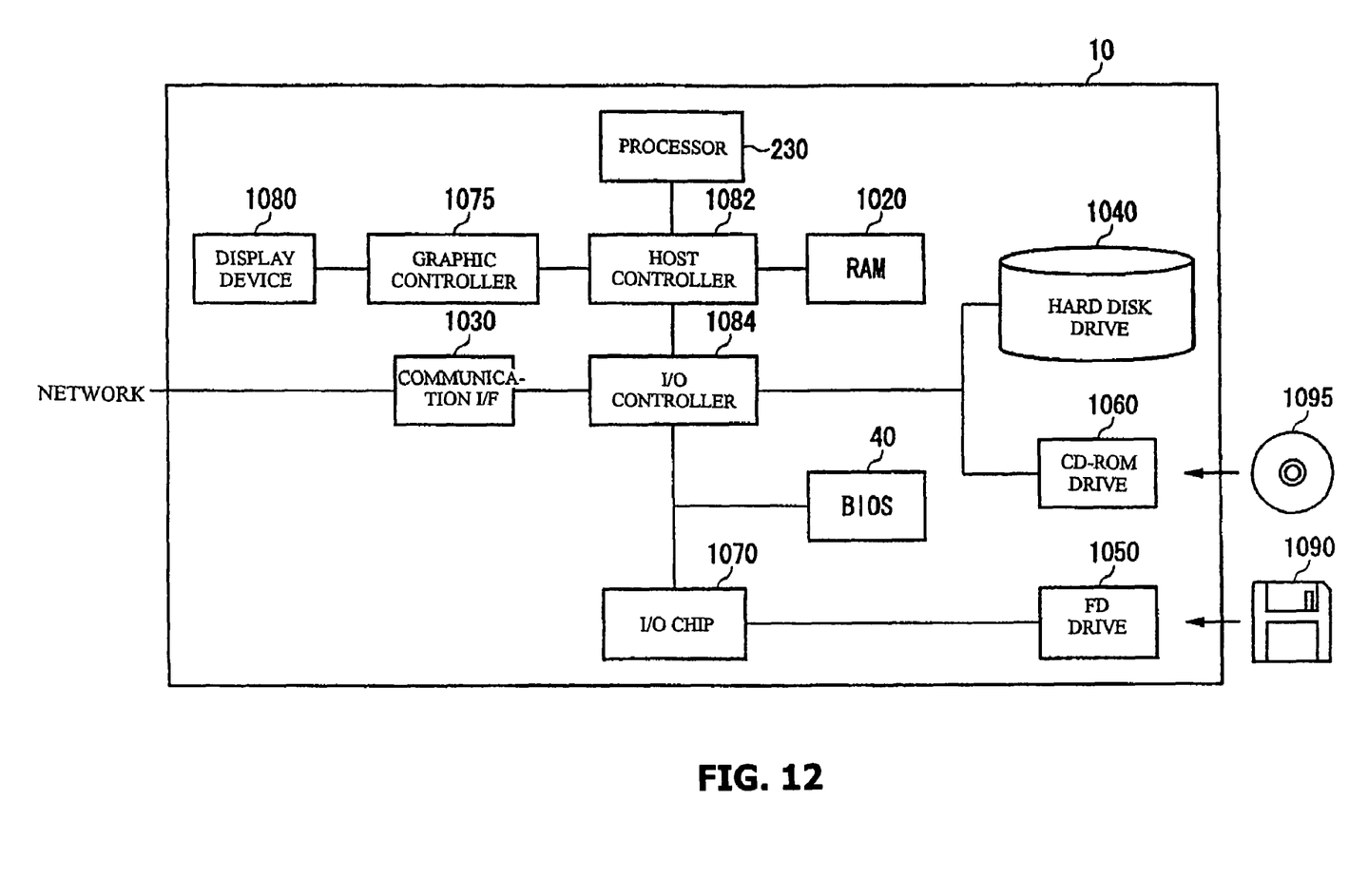
FIG. 12 is a diagram showing an example of a hardware configuration of the information processor 10 in the embodiment or the example of modification.

FIG. 12 shows an example of a hardware configuration of the information processor 10 in this embodiment or the example of modification. The information processor 10 in this embodiment or the example of modification has a CPU peripheral section having a processor 230, a RAM 1020, a graphic controller 1075 and a display device 1080 connected to each other by a host controller 1082, an input/output section having a communication interface 1030, a hard disk drive 1040 and a CD-ROM drive 1060 connected to the host controller 1082 by an input/output controller 1084, and a legacy input/output section having a BIOS 40, a flexible disk drive 1050 and an input/output chip connected to the input/output controller 1084.

The host controller 1082 connects the RAM 1020, and the processor 230 and the graphic controller 1075, which access the RAM 1020 at a high transfer rate. The processor 230 operates on the basis of programs stored in the BIOS 40 and the RAM 1020, and controls each component. The graphic controller 1075 obtains image data generated by the processor 230, etc., on a frame buffer provided in the RAM 1020, and displays the image data on the display device 1080. Alternatively, the graphic controller 1075 may contain therein a frame buffer for storing image data generated by the processor 230, etc.

The input/output controller 1084 connects the host controller 1082, the communication interface 1030, which is an input/output device of a comparatively high speed, the hard disk drive 1040 and the CD-ROM drive 1060. The communication interface 1030 performs communication with other units through a network. The hard disk drive 1040 stores programs and data used by the information processor 10. The CD-ROM drive 1060 reads a program or data from a CD-ROM 1095 and provides the read program or data to the input/output chip 1070 via the RAM 1020.

To the input/output controller 1084 are also connected the BIOS 40 and input/output devices of a comparatively low speed, i.e., the flexible disk drive 1050 and the input/output chip 1070 or the like. The BIOS 40 stores a boot program executed by the processor 230 at the time of startup of the information processor 10, and programs, etc., dependent on the hardware of the information processor 10. The flexible disk drive 1050 reads a program or data from a flexible disk 1090 and provides the read program or data to the input/output chip 1070 via the RAM 1020. The input/output chip 1070 connects the flexible disk 1090 and various input/output devices, for example, through a parallel port, a serial port, a keyboard port, a mouse port, etc.

A program provided to the information processor 10 is provided by a user in a state of being stored on a recording medium, such as the flexible disk 1090, the CD-ROM 1095 or an IC card. The program is read out from the recording medium, installed in the information processor 10 via the input/output chip 1070, and executed in the information processor 10. A program installed and executed in the information processor 10 includes an operating mode switching module, a support flag storage module, a polling interval storage module, a set cycle storage module, a periodic switching detection module, an operating mode changing module, and an operation detection module. Operations which the information processor 10 is made by the modules to perform are the same as the operations of the corresponding components in the information processor 10 described above with reference to FIGS. 1 to 11. Therefore, description of the operations will not be repeated.

The above-described program or modules may be stored on an external storage medium. As the recording medium, an optical recording medium such as a DVD or a PD, a magneto-optic recording medium such as an MD, a tape medium, a semiconductor memory such as an IC card, or the like can be used as well the flexible disk 1090 and the CD-ROM 1095. Also, a storage device such as a hard disk or a RAM provided in a server system connected to a special-purpose communication network or the Internet may be used as the recording medium to provide the program to the information processor 10 via the network.

According to this embodiment, as described above, the information processor 10 can prevent generation of noise which is generated in a case where the switching cycle in an operating mode is shorter than a predetermined set cycle, and which is harsh to user's year. This embodiment can be realized by software alone without changing the hardware. That is, noise can be prevented without influencing the parts layout designed for the purpose of reducing the information processor 10 or for other purposes. Further, the program described in the description of this embodiment enables prevention of noise generated by information processors 10 already shipped.

While the present invention has been described with respect to the embodiment thereof, it is not limited to the scope described above with respect to the embodiment. Various changes and medications may be made in the above-described embodiment. It is apparent from the description in the appended claims that other embodiments of the invention provided by making such changes and modifications are also included in the technical scope of the present invention.

As is apparent from the above description, the present invention enables prevention of noise harsh to the user's ear.

What is claimed is:

1. An information processor having a plurality of operating modes differing in power consumption and capable of changing the operating mode according to an amount of processing, said information processor comprising:
   periodic switching detection device for performing detection as to whether the information processor is periodically switching from a low-power operating mode in which the power consumption is lower to a high-power operating mode in which the power consumption is higher in the plurality of operating modes; and
   operating mode changing device for changing the operating modes between which the information processor switches to a combination of the operating modes such that a difference between the power consumptions is reduced relative to that at a time of switching between the low-power operating mode and the high-power operating mode if a switching cycle detected by said periodic switching detection device is shorter than a set cycle determined in advance.

2. The information processor according to claim 1, wherein if the switching cycle is longer than the set cycle, said operating mode changing device changes the operating modes between which the information processor switches to a second combination of the operating modes having a difference in power consumption larger than that between the low-power operating mode and the high-power operating mode.

3. The information processor according to claim 2, wherein if the switching cycle is longer than the set cycle, said operating mode changing device changes the operating mode from which the information processor switches, from one of the operating modes in which a clock to a processor in the information processor is stopped to another of the operating modes in which a voltage of a power supply to the processor in the information processor is further reduced while the clock to the processor is stopped.

4. The information processor according to claim 1, wherein if the switching cycle is shorter than the set cycle, said operating mode changing device changes the operating mode from which the information processor switches, from one of the operating modes in which a voltage of a power supply to a processor in the information processor is further reduced while a clock to the processor is stopped to another of the operating modes in which the clock to the processor in the information processor is stopped.

5. The information processor according to claim 1, wherein if the switching cycle is equal to or shorter than a cycle of about 1 ms when the set cycle is equal to this value, said operating mode changing device changes the operating modes between which the information processor switches to another combination of the operating modes having difference in power consumption smaller than that between the low-power operating mode and the high-power operating mode.

6. The information processor according to claim 1, further comprising operating mode switching device of switching from the low-power operating mode to the high-power operating mode when a timer interrupt to a processor in the information processor is effected, and switching from the high-power operating mode to the low-power operating mode when the processor is not being used, wherein said periodic switching detection device obtains the cycle of said timer interrupt to the processor as the switching cycle.

7. The information processor according to claim 1, wherein said periodic switching detection device obtains as the switching cycle the interval of time slicing by which an operating system of the information processor assigns the processor to an application program.

8. An information processor having a plurality of operating modes differing in power consumption and capable of changing the operating mode according to an amount of processing, said information processor comprising:

operation detection device for performing detection as to whether a cycle setting program is operating by which a cycle of switching from a low-power operating mode in which the power consumption is lower to a high-power operating mode in which the power consumption is higher in the plurality of operating modes is set shorter than a set cycle determined in advance; and operating mode changing device for changing, when an operating state of the cycle setting program is detected, the operating modes between which the information processor switches to a combination of the operating modes such that a difference between the power consumptions is reduced relative to that at a time of switching between the low-power operating mode and the high-power operating mode, which reduces acoustic noise resulting from periodically switching the operating modes.

9. An information processor having a plurality of operating modes differing in power consumption and capable of changing the operating mode according to an amount of processing, said information processor comprising:

operation detection device for waiting for speech data or image data to be selected by a user and performing detection as to whether a reproduction application program for reproducing the speech data or image data is operating when the speech data or image data is selected by the user; and operating mode changing device for changing, when an operating state of the reproduction application program is detected, the operating modes between which the information processor switches to a combination of the operating modes such that a difference between the power consumptions is reduced relative to that at a time of switching between the operating modes in combination before detection of the reproduction application program.

* * * * *